(12) United States Patent  (10) Patent No.: US 9,056,521 B2
Cappellotto  (45) Date of Patent: Jun. 16, 2015

(54) WHEEL SPOKE

(75) Inventor: Guido Cappellotto, Arcore (IT)

(73) Assignee: Alpina Raggi, S.p.A., Lomagna (IT)

( * ) Notice: Subject to any disclaimer, the term of this patent is extended or adjusted under 35 U.S.C. 154(b) by 426 days.

(21) Appl. No.: 13/394,385

(22) PCT Filed: Aug. 31, 2010

(86) PCT No.: PCT/EP2010/062683
§ 371 (c)(1),
(2), (4) Date: Jun. 15, 2012

(87) PCT Pub. No.: WO2011/026831
PCT Pub. Date: Mar. 10, 2011

(65) Prior Publication Data
US 2012/0242139 A1   Sep. 27, 2012

(30) Foreign Application Priority Data

Sep. 7, 2009   (IT) .............................. PD2009A0253

(51) Int. Cl.
*B60B 1/02* (2006.01)
*B60B 1/00* (2006.01)
*B60B 1/04* (2006.01)

(52) U.S. Cl.
CPC . *B60B 1/003* (2013.01); *B60B 1/02* (2013.01); *B60B 1/045* (2013.01); *B60Y 2200/13* (2013.01)

(58) Field of Classification Search
CPC ...... B60B 1/02; B60B 1/0246; B60B 1/0261; B60B 1/04; B60B 1/042; B60B 1/043; B60B 1/003
USPC ...................... 301/58, 59, 61, 104; 29/894.33; 264/299; 425/406
See application file for complete search history.

(56) References Cited

U.S. PATENT DOCUMENTS 8,651,583 B2 *   2/2014   Kanehisa et al. ................ 301/59
2006/0261666 A1 *   11/2006   Passarotto ...................... 301/104

FOREIGN PATENT DOCUMENTS

DE   29718860 U1   1/1998
EP   1559582 A1   8/2005
EP   1724122 A1   11/2006
JP   06219101 A *   8/1994

OTHER PUBLICATIONS

International Search Report and Written Opinion in PCT/EP2010/062683.
International Preliminary Report on Patentability in related PCT application PCT/EP2010/062683.

* cited by examiner

*Primary Examiner* — Kip T Kotter
(74) *Attorney, Agent, or Firm* — Kristina Castellano; Castellano PLLC

(57) ABSTRACT

A wheel spoke includes a shaft, a head at an axial end of the shaft, and a head rear surface on the face of the head which faces towards the shaft; the head rear surface has a plurality of alternating raised portions and recesses which can define a discontinuous contact surface.

9 Claims, 4 Drawing Sheets

PRIOR ART

WHEEL SPOKE

CLAIM FOR PRIORITY

This application is a U.S. National Stage Application of PCT/EP2010/062683 filed on Aug. 31, 2010, claiming priority to Italian application PD2009A000253 filed Sep. 7, 2009, the contents of both of which are incorporated herein by reference.

DESCRIPTION

The subject of the present invention is a wheel spoke, a method of producing the spoke, and an open-matrix mould usable for the production thereof.

It is well known that a wheel spoke includes a shaft, a head at an axial end of the shaft, and a head rear surface on the face of the head which faces towards the shaft. Owing to manufacturing requirements and, in particular, to requirements for removal from the mould, the head of the spoke is moulded with a so-called open-matrix mould, that is, a mould which is composed of two or more parts that can be moved towards one another to an operative, closure position and moved apart to facilitate the removal of the spoke from the mould.

However accurate the coupling surfaces between the parts of the mould may be, they almost inevitably leave small amounts of flash or indentations on the head rear surface, in relief relative to the surface itself.

This flash may be particularly harmful when both the spoke and the wheel hub in which the seats for housing the heads are formed are made of relatively brittle and undeformable materials. In fact, in that case, the flash, which constitutes the sole point of support of the head rear surface in the hub seat, may produce stress peaks such as to damage the spoke to the extent of causing possible fracture thereof.

The current approach to solving this problem is to limit, flatten or somehow reduce the formation of flash during moulding to improve the distribution of the working load between the head rear surface and the seat which houses it. On the other hand, the way to eliminate the flash completely would be to use a closed-matrix mould which, since it would not have discontinuities, would enable a perfectly smooth head rear surface to be obtained.

However, the use of a closed-matrix mould conflicts with the practicality of removing the spoke from the mould. In fact, whereas removal is generally possible when moulding the spoke nipples which, since they are very short, can easily be removed from a closed-matrix mould by means of pin extractors or the like, the considerable length of the spoke shaft does not allow the same method to be used.

It is therefore almost unavoidable to use open-matrix moulds for the spokes and to accept any flash and its harmful consequences.

The problem underlying the invention is to minimize the adverse effects of any flash formed on the head rear surface during the moulding of the spoke.

Within the scope of this problem, an important objective of the invention is to improve the strength of the spokes in the head region.

Another objective of the invention, which is useful particularly for straight pull spokes (that is, spokes with the head coaxial with the shaft) or slightly elbowed spokes, is that of preventing rotation between the head of the spoke and the seat in which it is fitted when the spoke is under tension.

This problem is solved and these objectives and others which will be explained further below are achieved by the invention by means of a spoke formed in accordance with the appended claims.

The features and the advantages of the invention will become clearer from the following detailed description of some preferred but not exclusive embodiments which are described by way of non-limiting example with reference to the appended drawings, in which.

Figure 1:
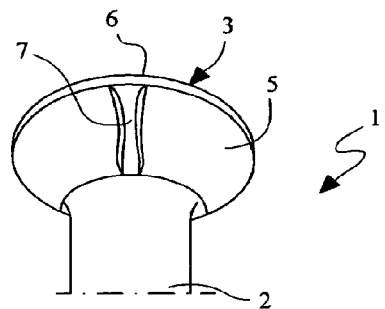
FIG. 1 is an enlarged view of a spoke head according to the prior art.

In FIG. 1, a wheel spoke, generally indicated 1, is of the type including a shaft 2 having a conventionally threaded end (not shown) and an opposite end having an enlarged head 3. The head 3 is produced by the moulding of the spoke in an open-matrix mould, that is, a mould composed of two or more parts which can be moved towards one another to an operative, closure position and moved apart to facilitate the removal of the spoke from the mould.

Opposed faces 5, 6 are defined on the head 3. The face 5 that faces towards the shaft has a conical, so-called "head rear surface" on which flash 7 is inevitably though undesirably produced, owing to the unavoidably imprecise closure of the coupling surfaces of the mould parts.

When the spoke is fitted on the wheel, the head 3 is restrained in a hub (which is not shown since it is conventional per se) with the head rear surface 5 nested in a seat of the hub. In this condition, as a result of the substantially pulsating working load to which the spoke is subjected during the rotation of the wheel, overloads may be produced, which are caused by the projection of the flash 7 and which, in the long term, may cause fatigue fracture of the spoke and/or in any case stressing of the material.

Figure 2:
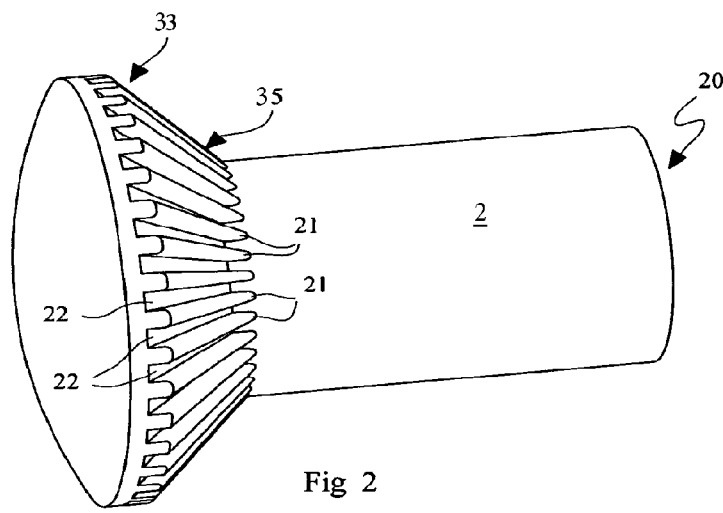
FIG. 2 is a side elevational, perspective view of a spoke head formed in accordance with a first embodiment of the present invention.

A spoke according to a first embodiment of the invention is generally indicated 20 in FIG. 2. Details similar to those of the preceding drawing are indicated by the same reference numerals. The spoke 20 is of the straight pull type, that is with a shaft 2 that is coaxial with the head 33, but the invention is also suitable for application to spokes with elbowed or partially elbowed spokes.

The spoke 20 differs from the spoke 1 substantially in that the head rear surface 35 bears a plurality of alternating raised portions and recesses 21, 22 which can define a discontinuous surface (limited to the ridges of the raised portions) for contact with the juxtaposed surface of the hub seat in which it is nested. Although, in this case, the area of contact between the head rear surface 35 and the housing hub seat is reduced it has been found that the spoke thus produced has improved strength and reliability in comparison with spokes with conventional head rear surfaces.

The raised portions 21 and the resulting recesses 22 preferably extend radially (along the generatrices of the head rear surface, which is generally conical) with uniform thickness and rounded ridges of uniform radius (FIG. 2). They may also have a pitch which is smaller than the depth of the recesses 42

Figure 3:
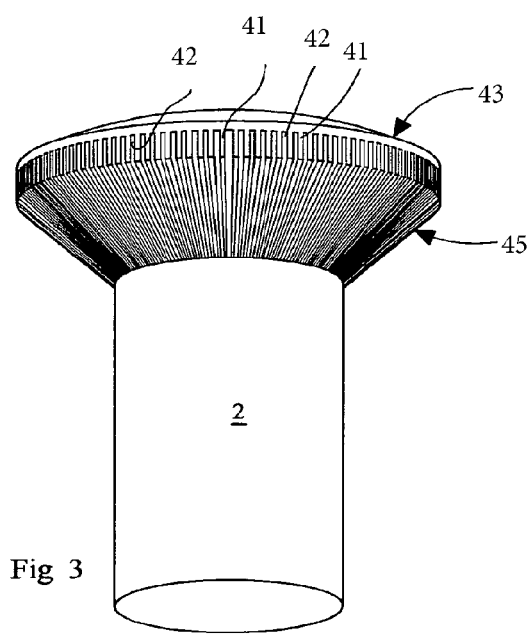
FIGS. 3 to 7 are perspective views of a corresponding number of spoke heads according to the invention.
Figure 4:
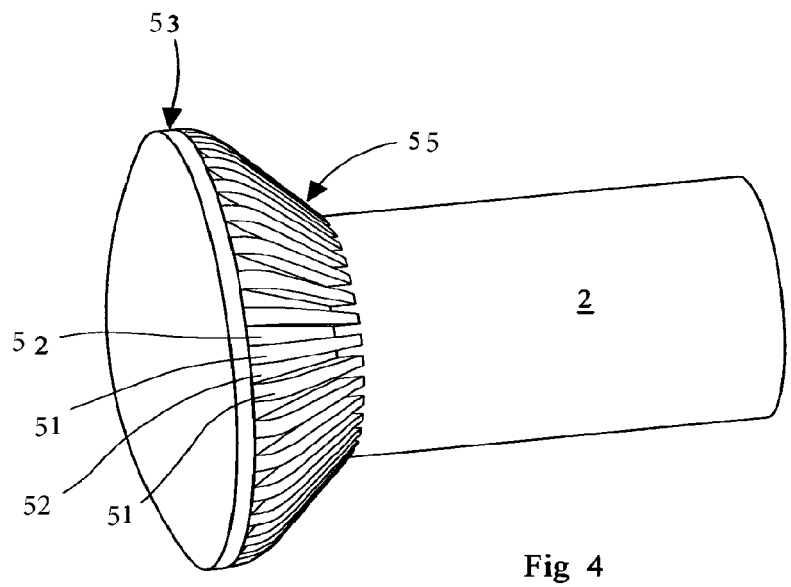
Figure 5:
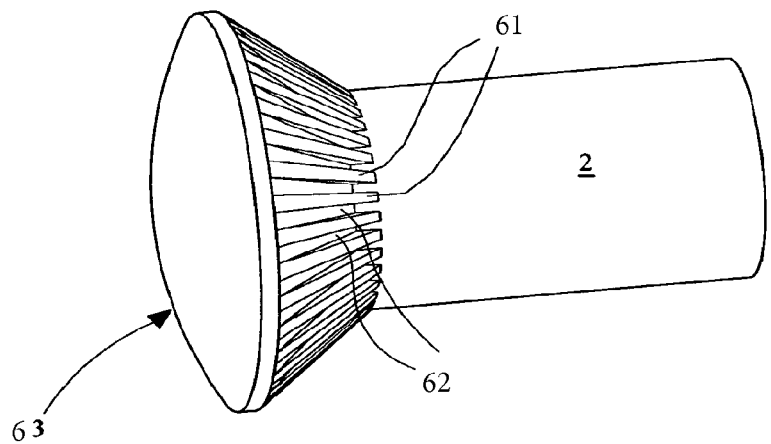

(a so-called "millerighe" profile—FIG. 3, FIG. 3 also shows raised portions 41, head 43 and head rear surface 45), or the raised portions 51 may be formed with sharp edges with a uniform cross-section along their radial extent (FIG. 4, also showing recesses 52, a head 53 and head rear surface 55), or with a shape that is tapered from the shaft 2 towards the outer edge of the head 63 rear surface (FIG. 5, also showing recesses 62 and raised portions 61).

Figure 6:
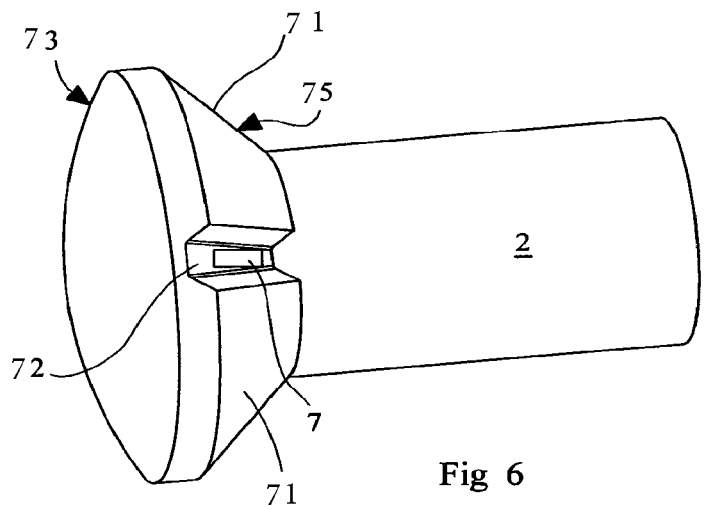

In all cases it is necessary or at least preferable that any flash and/or consequent indentations at the closure lines of the matrix for the moulding of the spoke be concealed in respective recesses 72 moulded in the head 73 rear surface 75 in the region of each flash (FIG. 6). Raised portions are designated 71 in FIG. 6.

Figure 7:
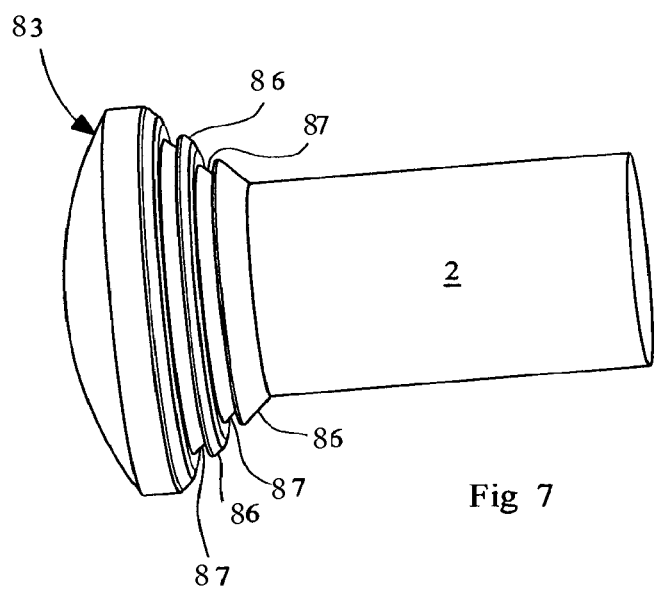
Figure 8:
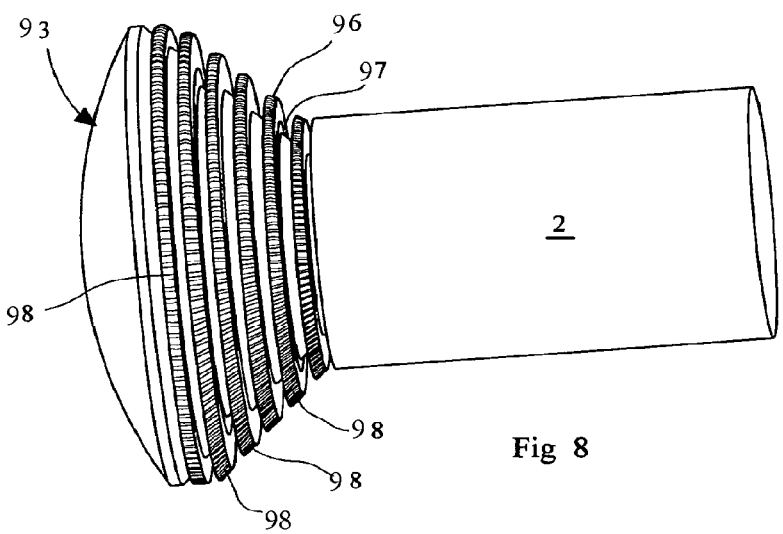
FIG. 8 is a schematic, perspective view of a stage of the removal from the mould of a spoke formed in accordance with the invention.

In a further embodiment of the invention, raised portions 86 and recesses 87 have a concentric, annular shape (FIG. 7, also showing head 83) in combination with the recesses of FIG. 6 and/or in combination with the multiple raised portions and recesses of the embodiments of FIGS. 2 to 5. In this case (FIG. 8), the raised portions 96 adopt the configuration of projections 98 distributed variously on the head 93 rear surface, the recesses in FIG. 8 being designated 97.

It has been found that, as well as resisting brittle fracture of the spoke shaft, the modification of the head rear surface in accordance with the teachings of the invention also effectively prevents rotation of the spoke relative to the seat in the hub; this is particularly advantageous with straight pull spokes, that is, spokes in which the shaft is entirely straight and coaxial with the head.

Figure 9:
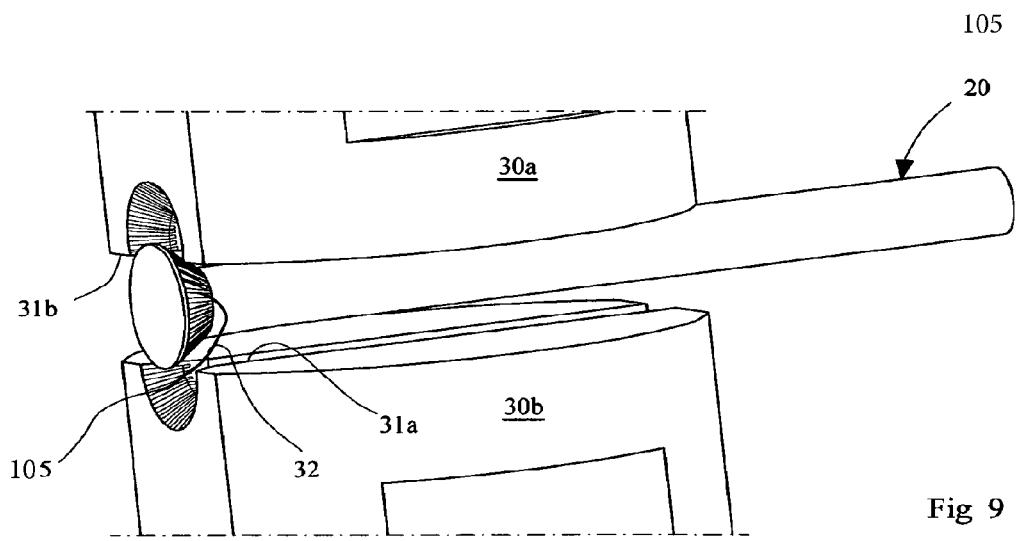
FIG. 9 depicts a view of a spoke head in accordance with the present invention having a formation on the rear head surface of a plurality of alternating raised portions and recesses.

A further subject of the invention is a method of producing a spoke according to the embodiments described above, that is, a spoke produced by moulding with an open-matrix mould 30a, 30b which is potentially liable to form flash and/or indentations in the region of the matrix closure lines. The spoke is produced, as shown in FIG. 9, with the formation on the rear head surface 105, of a plurality of alternating raised portions and recesses in which the said flash and/or indentations are concealed.

Finally, a subject of the invention is an open-matrix mould 30a, 30b for spokes of the type including a shaft, a head at an axial end of the shaft, and a head rear surface on the face of the head which faces towards the shaft, wherein the mould comprises at least two opposed closure lines 31a, 31b and at least one raised portion 32 in the region of each closure line, for imparting a corresponding recess 22 to the rear surface 105 of the spoke head.

The invention thus solves the problem posed and at the same time affords many advantages. In particular, as well as considerably reducing the risk of brittle fracture of the spoke in the head region, it also achieves the advantageous effect of preventing rotation of the spoke relative to the hub seat.

The invention claimed is:

1. A wheel spoke including comprising
a shaft,
a head at an axial end of the shaft, and
a head rear surface on a face of the head which faces towards the shaft,
wherein the head rear surface comprises a plurality of alternating raised portions and recesses which define a discontinuous contact surface, and wherein the raised portions and recesses comprise a plurality of appendages or projections.

2. The wheel spoke according to claim 1, wherein the head rear surface exhibits at least one flash and/or indentation produced by closure lines of a matrix used for moulding the spoke, wherein the spoke comprises at least one respective recess in a region of each flash or indentation in order to conceal the flash or indentation in the corresponding recess.

3. The wheel spoke according to claim 1, wherein the raised portions and recesses extend radially.

4. The wheel spoke according to claim 1, wherein the head rear surface is substantially conical.

5. The wheel spoke according to claim 1, wherein the raised portions are tapered from the shaft towards an outer edge of the head rear surface.

6. The wheel spoke according to claim 1, wherein the raised portions and recesses have a concentric, annular arrangement.

7. The wheel spoke according to claim 1, wherein the raised portions comprise elements for preventing rotation of the spoke head in a respective assembly seat.

8. A method of producing a wheel spoke by moulding with an open-matrix mould, comprising forming a plurality of alternating raised portions and recesses on a head rear surface of a spoke comprising a shaft, a head at an axial end of the shaft and the head rear surface on a face of the head, which faces towards the shaft; said open-matrix mould being capable of forming at least one flash and/or indentation in a region of matrix closure lines, said flash and/or indentations being capable of defining a discontinuous contact surface, wherein at least one respective recess is formed in a region of each flash or indentation in order to conceal the flash or indentation in the corresponding recess.

9. An open-matrix mould for spokes of a type including a shaft, a head at an axial end of the shaft, and a head rear surface on a face of the head which faces towards the shaft, the mould comprising at least two opposed closure lines and at least one raised portion in a region of each closure line for imparting a corresponding recess to the rear surface of the head of the spoke.

* * * * *